Patented July 12, 1949

2,476,004

UNITED STATES PATENT OFFICE 2,476,004

PRODUCTION OF PYRIDINE CARBOXYLIC ACIDS

Wilber Otis Teeters, Bergenfield, N. J., assignor to Allied Chemical & Dye Corporation, New York, N. Y., a corporation of New York No Drawing. Application October 9, 1942, Serial No. 461,417

12 Claims. (Cl. 260—295.5)

This invention relates to the catalytic oxidation to pyridine carboxylic acids of heterocyclic aromatic nitrogen compounds having an oxidizable organic grouping attached to the nitrogen-containing aromatic nucleus by one or more carbon-to-carbon linkages; more particularly, it relates to the production of nicotinic acid from compounds of this type.

The present need of plentiful supplies of the vitamin B complex for proper nutritional requirements has greatly increased the importance of producing suitable quantities of nicotinic acid, a member of the vitamin B complex, from heterocyclic aromatic nitrogen compounds obtainable from coal tar having an oxidizable organic grouping attached to the nitrogen-containing aromatic nucleus by one or more carbon-to-carbon linkages, e.g. quinoline or 3-picoline. It is known that such heterocyclic aromatic nitrogen compounds may be oxidized to form carboxylic acids by treatment with potassium permanganate or hydrogen peroxide. These methods require relatively expensive oxidizing reagents and the reaction is usually carried out in dilute solutions, with the result that undesirably large volumes of reaction mixtures must be handled.

It is an object of this invention to provide an effective process for the oxidation of heterocyclic aromatic nitrogen-containing compounds having an oxidizable organic grouping attached to the nitrogen-containing aromatic nucleus by one or more carbon-to-carbon linkages.

A more specific object of this invention is to provide a simple and practical process for the preparation of nicotinic acid from inexpensive heterocyclic aromatic nitrogen compounds such as quinoline or 3-picoline.

In accordance with this invention an N-heteroaryl compound having an oxidizable organic grouping attached to the nitrogen-containing aromatic nucleus by one or more carbon-to-carbon linkages is oxidized to a pyridine carboxylic acid by subjecting to elevated temperatures a mass formed by the admixture of said compound with sulfuric acid and a substance selected from the group consisting of halogens, hydrogen halides and halogen-containing compounds which react with sulfuric acid at 50° C. to yield free halogen or hydrogen halides. Substances selected from the above group, it has been found, catalyze oxidation of the N-heteroaryl compound with sulfuric acid so that good yields of the desired pyridine carboxylic acid may be obtained. A preferred embodiment of this invention involves carrying out the oxidation employing a substance selected from the above group, together with a selenium compound, since I have found that the use of such a catalyst mixture furnishes improved yields of the desired pyridine carboxylic acid.

Among the N-heteroaryl compounds having an oxidizable organic grouping attached to the nitrogen-containing aromatic nucleus by one or more carbon-to-carbon linkages which may be treated in accordance with this invention are the picolines, the lutidines, collidines, quinoline, hydroxyquinolines, quinoline sulfonic acids, isoquinoline, quinaldine, lepidine and nicotine. In every case it has been found that such compounds upon being subjected to treatment in accordance with my invention yield pyridine carboxylic acids; an important feature of my invention is that it permits the production of the highly valuable nicotinic acid in good yields from quinoline or 3-picoline. My invention, therefore, has not only succeeded in making a cheap oxidizing agent, namely, sulfuric acid, available for the production of valuable pyridine carboxylic acids, but has provided a comparatively inexpensive method of preparing nicotinic acid.

The term "N-heteroaryl compound" is employed throughout the specification and claims to denote a heterocyclic compound formed by the replacement of one

group of an aromatic nucleus by a nitrogen atom.

As hereinabove pointed out, my invention is applicable to the oxidation of any N-heteroaryl compound having an oxidizable organic grouping attached to the nitrogen-containing aromatic nucleus by one or more carbon-to-carbon linkages. The nature of the product obtained will vary, depending upon the particular compound treated. Thus, for example, the oxidation of 3-picoline, 2,3-lutidine, quinaldine, quinoline, 8-hydroxyquinoline, quinoline-8-sulfonic acid, or nicotine in accordance with this invention yields the highly valuable nicotinic acid, thus making possible the production of this material from a wide variety of N-heteroaryl compounds. Oxidation of 2-picoline yields picolinic acid, whereas oxidation of 4-picoline yields isonicotinic acid; oxidation of isoquinoline yields cinchomeronic acid. A preferred embodiment of my invention involves the oxidation of quinoline or 3-picoline to nicotinic acid since the quinoline and 3-picoline reactants are potentially cheap and readily available, and the product obtained is the most valuable of the pyridine carboxylic acids at the present time. The N- heteroaryl compounds treated may be in substantially pure condition, or in crude form as recovered from coal tar by fractionation.

The sulfuric acid employed is preferably concentrated sulfuric acid such as 66° Bé. acid, but more dilute acid such as 60° Bé. acid may be used, or, less desirably, fuming sulfuric acid. The amount of sulfuric acid employed may vary somewhat, depending upon the nature of the N-heteroaryl compound treated; thus, for example, oxidation of quinoline theoretically requires 10 mols of sulfuric acid per mol of quinoline, 9 mols being required for the actual oxidation and 1 mol for neutralization of the basic nitrogen atom of the product, whereas oxidation of 3-picoline theoretically requires only 4 mols of sulfuric acid per mol of 3-picoline, 3 mols being for the actual oxidation. Generally, the amount of sulfuric acid employed should be between about 33% and about 100% in excess of that theoretically required for the oxidation.

The catalytic material may be added to the reaction mixture in any suitable manner, the particular mode of addition depending upon the nature of the catalytic material to be employed. Thus, for example, if a gaseous substance such as chlorine, hydrogen chloride or hydrogen bromide is to be employed as the catalyst, the catalyst may be added to the reaction mixture by introduction of the gas below the surface of the reaction mixture by means of a suitable gas distributor. In the case of a liquid substance such as free bromine, the catalyst may be slowly added to the reaction mixture, preferably with good agitation. In the case of a solid catalyst, such as iodine or metal halides such as sodium or potassium bromide, the entire amount of the catalyst to be employed may be added to the reaction mixture at the start of the reaction, but preferably the catalyst is gradually added to the mixture throughout the course of the oxidation. Among the materials preferably employed as catalysts in accordance with this invention are chlorine, bromine, iodine, hydrogen chloride, hydrogen bromide, hydrogen iodide, iodic acid and other iodine oxides, iodine monochloride and other mixed halogen compounds, alkali metal chlorides, bromides or iodides, or mixtures of such substances. By the term halogen as used herein is meant those halogens having a molecular weight above 40, and the term halides is similarly employed to denote the halides derived from halogens of the above character, namely, chlorine, bromine, and iodine, as disclosed hereinabove. Preferably, these materials are added to the reaction mixture together with another catalytic material such as selenium or a selenium compound soluble in sulfuric acid (as disclosed and claimed in the copending application of M. B. Mueller, Serial No. 461,446, filed October 9, 1942, now U. S. Patent No. 2,436,660); a particularly suitable catalyst for use in accordance with my invention may be formed by the addition of a selenium compound soluble in sulfuric acid and an alkali metal bromide such as sodium or potassium bromide to the reaction mixture in proportions such that the selenium compound contains an equivalent of 0.5 to about 2.0 atoms of selenium per atom of bromine contained in the bromide. The amount of catalyst employed may vary widely, but generally between about 0.5 and about 25% by weight of the N-heteroaryl compound treated is suitable.

The oxidation may be carried out by mixing the reacting ingredients and a substance or mixture of substances selected from the group above defined in the proportions above indicated and heating the mixture at elevated temperatures, e. g. between about 200° and about 325° C., preferably in a vessel provided with means for condensing and/or collecting volatile material evolved from the reaction mixture. Oxidation of quinoline to nicotinic acid is preferably carried out at a temperature between about 295° and about 315° C. and oxidation of 3-picoline at from 305° to 315° C. The time necessary for carrying out such a batch reaction may vary considerably, but usually a period between about six and about twenty-four hours, preferably between about eight and about twelve hours, is sufficient.

The oxidation process of my invention is preferably carried out by heating a mixture of the major portion, e. g. approximately 70%, of the sulfuric acid to be employed to a temperature between about 200° and about 325° C. and gradually adding a mixture of the remainder of the sulfuric acid, the halogen or halogen-containing substance to be employed and the N-heteroaryl compound to be oxidized to the hot acid, while maintaining the temperature of the mixture within the above range; if desired, a portion of the halogen or halogen-containing substance may be added to the major portion of the sulfuric acid prior to the addition of the N-heteroaryl compound thereto. If a selenium compound is to be employed to assist the catalytic action, a portion thereof is preferably added to the major portion of the sulfuric acid prior to addition of the N-heteroaryl compound. After addition of the N-heteroaryl compound has been completed, the mixture may be heated at a temperature within the above range for an additional period of time, e. g. for from two to twenty hours, in order to complete the oxidation. This method has the advantage of avoiding substantial sulfonation of the N-heteroaryl compound, a reaction which tends to occur to some extent if the reactants are heated from room temperature to reaction temperature over a relatively long period of time. Furthermore, the gradual addition of the halogen or halogen-containing substance to the reaction mixture permits the maintenance therein at all times of the optimum amount of catalyst for the oxidation reaction, whereas in a process in which the entire amounts of the reactants are mixed at the start of the reaction the tendency of the catalyst to distill from the reaction mixture sometimes results in too little catalyst being present in the reaction mixture at the end of the reaction.

The pyridine carboxylic acid product obtained as a result of the oxidation may be recovered in any suitable manner. In the case of nicotinic acid, produced in accordance with the preferred embodiment of this invention, the acid reaction mixture containing free sulfuric acid and nicotinic acid sulfate, plus any residual catalytic material, may be cooled to room temperature and poured into water or ice; the sulfuric acid may then be partially neutralized with alkaline material such as ammonia and the selenium precipitate which forms, if selenium is present in the catalyst employed, separated by filtration. The pH value of the solution may then be raised to between 5 and 7 by adding sufficient alkali or by adding an excess of ammonia thereto and boiling until the solution becomes acid to litmus, and the nicotinate converted into copper nicotinate by reaction with copper sulfate; the copper nicotinate precipitate may be recovered by filtration and converted by reaction with sodium hydroxide into sodium nicotinate. Nicotinic acid is preferably recovered from the sodium nicotinate by the addition of an acid such as hydrochloric or sulfuric acid to the sodium nicotinate solution until the pH value thereof is between about 3 and about 4, preferably between about 3.4 and about 3.6, and cooling, since it has been found maximum yields of nicotinic acid may thereby be obtained; a Brom Phenol Blue indicator may be used in adjusting the pH value since the neutral point of this indicator to nicotinic acid, i. e. the point at which the indicator just turns yellow, is within the ranges above mentioned. The nicotinic acid may also be recovered by decomposing the copper nicotinate with hydrogen sulfide, separating the copper sulfide and recovering the nicotinic acid from the filtrate.

The following examples are illustrative of my invention. Amounts are given in parts by weight.

Example 1.—920 parts of 95% sulfuric acid, 4 parts of potassium bromide and 1.75 parts of selenium were mixed and the mixture heated to 300° C. in a vessel provided with an air condenser. A mixture of 85 parts of substantially pure quinoline, 4 parts of potassium bromide, 1.17 parts of selenium and 368 parts of sulfuric acid was then gradually added to the hot mixture over a period of about four hours, the temperature of the mixture being maintained at 300° C. After all the quinoline had been added the reaction mixture was heated for an additional three hours at a temperature of 300° C. At the end of this time the reaction mixture was permitted to cool to room temperature and the cooled mixture was poured into crushed ice and 630 parts of a 28% ammonia solution added; the selenium which precipitated was recovered by filtration and the filtrate was boiled for twenty minutes with 20 parts of decolorizing carbon and filtered hot. The filtrate was then made alkaline by the addition of an excess of a 28% ammonia solution and the alkaline solution boiled for twenty minutes with 20 parts of decolorizing carbon and filtered hot. The resulting filtrate was heated to boiling and a solution of 100 parts of $CuSO_4.5H_2O$ in 300 parts of water was added thereto. The resulting light blue slurry of copper nicotinate was boiled for fifteen minutes and filtered hot. The copper nicotinate filter cake was washed with hot water and then dried at 120° C.

62 parts of the copper nicotinate prepared as above described were boiled for thirty minutes with a solution of 20 parts of sodium hydroxide in 350 parts of water. At the end of this time the hot slurry was filtered and the copper oxide filter cake washed with boiling water, the wash water being combined with the filtrate. The combined filtrate and washings were then concentrated by boiling and the nicotinic acid liberated from the sodium nicotinate contained therein by the addition of sufficient concentrated hydrochloric acid to make the solution neutral to Brom Phenol Blue. The resulting slurry of nicotinic acid was cooled to about 5° C. and maintained at this temperature for one and a half hours, at the end of which time the nicotinic acid crystals were recovered by filtration. The product was washed with cold water and dried at 80° C., whereby nicotonic acid, melting at 235° C., was obtained.

Example 2.—0.57 part of selenium was added to 248 parts of 66° Bé. sulfuric acid, the mixture heated with agitation to between 290° and 300° C. and maintained at a temperature within this range for about fifteen minutes until the selenium reacted therewith; the solution was cooled to about 20° to 30° C., 88.5 parts of 3-picoline slowly added thereto with agitation, while maintaining the temperature below about 50° C., the solution again cooled to about 20° to 30° C., and 1.67 parts of sodium bromide gradually added with agitation. 360 parts of 66° Bé. sulfuric acid containing 0.84 part of selenium dissolved therein were then heated to a temperature between 312° and 315° C. and the 3-picoline solution formed as described above gradually added thereto over a period of about five hours while maintaining the reaction mixture at a temperature between 312° and 315° C. After all the 3-picoline had been added the mixture was held at a temperature between 312° and 315° C. for an additional six hours while maintaining the volume of the reaction mixture substantially constant by periodic addition of 66° Bé. sulfuric acid. At the end of this time the mass was permitted to cool to between 50° and 60° C. and was poured into 400 parts of ice. The solution formed was partially neutralized with 244 parts of 50% sodium hydroxide solution and the resulting slurry boiled with 12 parts of decolorizing carbon for fifteen to twenty minutes and filtered hot; the carbon filter cake was washed with water until free of mother liquor and the washings added to the filtrate. The filtrate was then neutralized with 50% sodium hydroxide solution until alkaline to Brilliant Yellow paper and the resulting alkaline solution was boiled with 12 parts of decolorizing carbon for fifteen to twenty minutes and filtered hot; the carbon filter cake was washed with water until free of mother liquor and the washings added to the filtrate. The resulting filtrate was heated to boiling and the pH value thereof adjusted to 6.5 by addition of dilute sulfuric acid; to this hot solution was then added a concentrated aqueous solution containing 122 parts of $CuSO_4.5H_2O$ and the resulting slurry boiled for fifteen to twenty minutes and filtered hot. The copper nicotinate filter cake was then slurried at room temperature with a 10% sodium hydroxide solution, the slurry heated to boiling, 10 parts of decolorizing carbon added and the mixture boiled for fifteen to twenty minutes and filtered hot. The filtrate was then concentrated, sulfuric acid added thereto until the pH of the solution was between 3.4 and 3.6, the resulting slurry cooled to between 0° and 5° C. and the nicotinic acid precipitate recovered by filtration.

Example 3.—920 parts of 95% sulfuric acid and 6.5 parts of iodine were mixed and the mixture heated to a temperature of about 300° C. in a vessel provided with an air condenser. A mixture of 85 parts of substantially pure quinoline and 368 parts of 95% sulfuric acid was then gradually added to the hot acid over a period of about four hours while maintaining the temperature of the reaction mixture at about 300° C. At the end of this time the reaction mixture was heated for an additional three and a half hours at about 300° C. Nicotinic acid was recovered from the reaction mixture as described in Example 1.

Example 4.—920 parts of 95% sulfuric acid were heated in a vessel provided with an air condenser to about 300° C. and a mixture of 85 parts of substantially pure quinoline, 6 parts of potassium bromide and 368 parts of 95% sulfuric acid gradually added thereto over a period of about five hours while maintaining the temperature of the reaction mixture at about 300° C. At the end of this time the reaction mixture was heated for an additional eight hours at 300° C. Nicotinic acid was recovered from the reaction mixture as described in Example 1.

*Example 5.*—A solution of 10 parts of potassium bromide, 3 parts of selenium and 59.5 parts of 95% nicotine in 370 parts of 95% sulfuric acid was gradually added to a solution of 4.25 parts of selenium in 920 parts of 95% sulfuric acid over a period of six and a half hours, the temperature being maintained at 310° C. The reaction mixture was then maintained at 310° C. for an additional four hours. The nicotinic acid thus produced was recovered as described in Example 1.

*Example 6.*—A solution of 10 parts of potassium bromide, 3 parts of selenium and 86 parts of quinaldine in 720 parts of 95% sulfuric acid was gradually added to a solution of 4.25 parts of selenium in 920 parts of 95% sulfuric acid over a period of eight and a half hours, the temperature being maintained at 310° C. The temperature of the reaction mixture was then maintained at 310° C. for an additional three hours. Nicotinic acid was recovered from the reaction mixture as described in Example 1.

*Example 7.*—A solution of 2 parts of potassium bromide, 1.17 parts of selenium and 107 parts of 2,3-lutidine in 620 parts of 95% sulfuric acid was gradually added to a solution of 2 parts of potassium bromide and 1.75 parts of selenium in 930 parts of 95% sulfuric acid over a period of four hours, the temperature being maintained at 315° C. The temperature of the reaction mixture was then maintained at 315° C. for an additional three hours. Nicotinic acid was recovered from the reaction mixture by the procedure described in Example 1.

*Example 8.*—A solution of 6 parts of potassium bromide, 1.8 parts of selenium and 255 parts of quinoline in 1650 parts of 95% sulfuric acid was added dropwise to a solution of 0.85 part of selenium in 920 parts of 95% sulfuric acid over a period of twelve hours, the temperature being maintained between 300° and 305° C. The reaction mixture was then maintained within the above temperature range for an additional four hours. Nicotinic acid was recovered from the reaction mixture as described in Example 1.

*Example 9.*—A solution of 1 part of sodium chloride, 0.6 part of selenium and 85 parts of isoquinoline in 370 parts of 95% sulfuric acid was gradually added to a solution of 0.9 part of selenium in 920 parts of 95% sulfuric acid over a period of three hours, the temperature being maintained at 280° C. The temperature of the reaction mixture was then maintained at 280° C. for an additional two hours. At the end of this time the reaction mixture was cooled to room temperature, poured over cracked ice, the acid solution neutralized to a pH value between 5 and 6 with an ammonia solution and treated with decolorizing carbon and filtered. The filtrate was adjusted to a pH value between 8 and 9 with additional ammonia and again treated with decolorizing carbon and filtered. The resulting filtrate was acidified with sulfuric acid to a pH value of 1.5 and then cooled to between 0° and 5° C. whereby substantially pure cinchomeronic acid was obtained.

*Example 10.*—A solution of 2 parts of potassium bromide, 1.17 parts of selenium and 186 parts of 2-picoline in 320 parts of sulfuric acid was gradually added to a solution of 2 parts of potassium bromide and 1.75 parts of selenium in 920 parts of 95% sulfuric acid over a period of five and a half hours, the temperature being maintained at 305° C. The temperature of the reaction mixture was then maintained at 305° C. for an additional three hours. Picolinic acid was recovered from the reaction mixture by the formation of copper picolinate and conversion of the copper picolinate to picolinic acid by reaction with sodium hydroxide and acidification of the sodium picolinate.

*Example 11.*—A solution of 2 parts of potassium bromide, 1.17 parts of selenium and 186 parts of 4-picoline in 500 parts of 95% sulfuric acid was gradually added to a solution of 2 parts of potassium bromide and 1.75 parts of selenium in 740 parts of 95% sulfuric acid over a period of six hours, the temperature being maintained at 310° C. The reaction mixture was then maintained at 310° C. for an additional hour, at the end of which time it was cooled and poured over ice. The dilute acid solution was neutralized with ammonia to a pH value of 3.5 and cooled; isonicotinic acid precipitated and was recovered and dried.

It will be evident from the above description that my process provides an improved method of obtaining pyridine carboxylic acids from N-heteroaryl compounds employing a cheap and readily available oxidizing agent; in view thereof more economical production of the important nicotinic acid is made possible.

Since certain changes may be made in carrying out the above process without departing from the scope of the invention, it is intended that all matter contained in the above description shall be interpreted as illustrative and not in a limiting sense.

I claim:

1. A process for the oxidation to a pyridine carboxylic acid of an N-heteroaryl compound containing a pyridine nucleus and having an oxidizable organic grouping attached to the nitrogen-containing aromatic nucleus by at least one carbon-to-carbon linkage, which comprises subjecting a mixture of said N-heteroaryl compound, sulfuric acid in an amount between about 33% and about 100% in excess of that theoretically required for both the oxidation of the particular N-heteroaryl compound to the desired pyridine carboxylic acid and the maintenance of the pyridine carboxylic acid in the form of the sulfate, and a substance selected from the group consisting of halogens, hydrogen halides, and halogen-containing compounds which react with sulfuric acid at 50° C. to yield a substance selected from the group consisting of free halogens and hydrogen halides to elevated temperatures of at least 200° C. to oxidize the N-heteroaryl compound, and recovering a compound containing a pyridine carboxylic radical, the amount of catalyst employed being between about 0.5% and about 25% by weight of the N-heteroaryl compound.

2. A process for the oxidation to a pyridine carboxylic acid of an N-heteroaryl compound containing a pyridine nucleus and having an oxidizable organic grouping attached to the nitrogen-containing aromatic nucleus by at least one carbon-to-carbon linkage, which comprises subjecting to a temperature between about 200° and about 325° C. a mass formed by the admixture of said N-heteroaryl compound with sulfuric acid in an amount between about 33% and about 100% in excess of that theoretically required for both the oxidation of the particular N-heteroaryl compound to the desired pyridine carboxylic acid and the maintenance of the pyridine carboxylic acid in the form of the sulfate, and, as a catalyst, a substance selected from the group consisting of halogens, hydrogen halides and halogen-containing compounds which react with sulfuric acid at 50° C. to yield a compound selected from the group consisting of free halogens and hydrogen halides, thereby producing a pyridine carboxylic acid, the amount of catalyst employed being between about 0.5% and about 25% by weight of the N-heteroaryl compound.

3. A process for the oxidation to a pyridine carboxylic acid of an N-heteroaryl compound containing a pyridine nucleus and having an oxidizable organic grouping attached to the nitrogen-containing aromatic nucleus by at least one carbon-to-carbon linkage, which comprises subjecting to a temperature between about 200° and about 325° C. a mass formed by the admixture of said compound with sulfuric acid in an amount between about 33% and about 100% in excess of that theoretically required for both the oxidation of the particular N-heteroaryl compound to the desired pyridine carboxylic acid and the maintenance of the pyridine carboxylic acid in the form of the sulfate, and, as catalysts, a substance selected from the group consisting of halogens, hydrogen halides, and halogen-containing compounds which react with sulfuric acid at 50° C. to yield a compound selected from the group consisting of free halogens and hydrogen halides, and a substance selected from the group consisting of selenium and selenium compounds soluble in sulfuric acid, and recovering the pyridine carboxylic acid produced, the amount of catalyst employed being between about 0.5% and about 25% by weight of the N-heteroaryl compound.

4. A process for the production of nicotinic acid which comprises subjecting to elevated temperatures of at least 200° C. a mass formed by the admixture of quinoline with sulfuric acid in an amount between about 33% and about 100% in excess of that theoretically required for both the oxidation of the quinoline to nicotinic acid and the maintenance of the nicotinic acid in the form of the sulfate, and, as a catalyst, a substance selected from the group consisting of halogens, hydrogen halides, and halogen-containing compounds which react with sulfuric acid at 50° C. to yield a compound selected from the group consisting of free halogens and hydrogen halides, and recovering the nicotinic acid produced, the amount of catalyst employed being between about 0.5% and about 25% by weight of the quinoline.

5. A process for the production of nicotinic acid which comprises subjecting to elevated temperatures of at least 200° C. a mass formed by the admixture of 3-picoline with sulfuric acid in an amount between about 33% and about 100% in excess of that theoretically required for both the oxidation of the 3-picoline to nicotinic acid and the maintenance of the nicotinic acid in the form of the sulfate, and, as a catalyst, a substance selected from the group consisting of halogens, hydrogen halides, and halogen-containing compounds which react with sulfuric acid at 50° C. to yield a compound selected from the group consisting of free halogens and hydrogen halides, and recovering the nicotinic acid produced, the amount of catalyst employed being between about 0.5% and about 25% by weight of the 3-picoline.

6. A process for the production of cinchomeronic acid which comprises subjecting to elevated temperatures of at least 200° C. a mass formed by the admixture of isoquinoline with sulfuric acid in an amount between about 33% and about 100% in excess of that theoretically required for both the oxidation of the isoquinoline to cinchomeronic acid and the maintenance of the cinchomeronic acid in the form of the sulfate, and, as a catalyst, a substance selected from the group consisting of halogens, hydrogen halides, and halogen-containing compounds which react with sulfuric acid at 50° C. to yield a compound selected from the group consisting of free halogens and hydrogen halides, and recovering the cinchomeronic acid produced, the amount of catalyst employed being between about 0.5% and about 25% by weight of the isoquinoline.

7. A process for the production of nicotinic acid which comprises subjecting to a temperature between about 295° and about 315° C. a mass formed by the admixture of quinoline with sulfuric acid in an amount between about 33% and about 100% in excess of that theoretically required for both the oxidation of the quinoline to nicotinic acid and the maintenance of the nicotinic acid in the form of the sulfate, and, as catalysts, a substance selected from the group consisting of halogens, hydrogen halides, and halogen-containing compounds which react with sulfuric acid at 50° C. to yield a compound selected from the group consisting of free halogens and hydrogen halides, and a substance selected from the group consisting of selenium and selenium compounds soluble in sulfuric acid, and recovering the nicotinic acid produced, the amount of catalyst employed being between about 0.5% and about 25% by weight of the quinoline.

8. A process for the production of nicotinic acid which comprises subjecting to a temperature between about 305° and about 315° C. a mass formed by the admixture of 3-picoline with sulfuric acid in an amount between about 33% and about 100% in excess of that theoretically required for both the oxidation of the 3-picoline to nicotinic acid and the maintenance of the nicotinic acid in the form of the sulfate, and, as catalysts, a substance selected from the group consisting of halogens, hydrogen halides, and halogen-containing compounds which react with sulfuric acid at 50° C. to yield a compound selected from the group consisting of free halogens and hydrogen halides, and a substance selected from the group consisting of selenium and selenium compounds soluble in sulfuric acid, and recovering the nicotinic acid produced, the amount of catalyst employed being between about 0.5% and about 25% by weight of the 3-picoline.

9. A process for the production of cinchomeronic acid which comprises subjecting to a temperature between about 200° and about 325° C. a mass formed by the admixture of isoquinoline with sulfuric acid in an amount between about 33% and about 100% in excess of that theoretically required for both the oxidation of the isoquinoline to cinchomeronic acid and the maintenance of the cinchomeronic acid in the form of the sulfate, and, as catalysts, a substance selected from the group consisting of halogens, hydrogen halides, and halogen-containing compounds which react with sulfuric acid at 50° C. to yield a compound selected from the group consisting of free halogens and hydrogen halides, and a substance selected from the group consisting of selenium and selenium compounds soluble in sulfuric acid, and recovering the cinchomeronic acid produced, the amount of catalyst employed being between about 0.5% and about 25% by weight of the isoquinoline.

10. A process for the production of nicotinic acid which comprises subjecting to a temperature between about 295° and about 315° C. a mass formed by the admixture of quinoline, sulfuric acid in an amount between about 33% and about 100% in excess of that theoretically required for both the oxidation of the quinoline to nicotinic acid and the maintenance of the nicotinic acid in the form of the sulfate, and, as catalysts, selenium and an alakli metal bromide, and recovering the nicotinic acid produced, the amount of catalyst employed being between about 0.5% and about 25% by weight of the quinoline.

11. A process for the oxidation to a pyridine carboxylic acid of an N-heteroaryl compound containing a pyridine nucleus and having an oxidizable organic grouping attached to the nitrogen containing aromatic nucleus by at least one carbon-to-carbon linkage, which comprises oxidizing said compound with sulfuric acid in an amount between about 33% and about 100% in excess of that theoretically required for both the oxidation of the particular N-heteroaryl compound to the desired pyridine carboxylic acid and the maintenance of the pyridine carboxylic acid in the form of the sulfate by gradually adding a mixture of the N-heteroaryl compound to be oxidized, a minor portion of the sulfuric acid reactant and, as a catalyst, a substance selected from the group consisting of halogens, hydrogen halides, and halogen-containing compounds which react with sulfuric acid at 50° C. to form a compound selected from the group consisting of free halogens and hydrogen halides, to a mass containing the major portion of the sulfuric acid reactant maintained at a temperature between about 200° and about 325° C., then holding the reaction mass at a temperature within this range until oxidation to the pyridine carboxylic acid is substantially complete, and recovering the pyridine carboxylic acid produced, the amount of catalyst employed being between about 0.5% and about 25% by weight of the N-heteroaryl compound.

12. A process for the production of nicotinic acid, which comprises oxidizing quinoline with sulfuric acid in an amount between about 33% and about 100% in excess of that theoretically required for both the oxidation of the quinoline to nicotinic acid and the maintenance of the nicotinic acid in the form of the sulfate by gradually adding a mixture of a minor portion of the sulfuric acid reactant, selenium, an alkali metal bromide and the quinoline to a mass containing the major portion of the sulfuric acid reactant maintained at a temperature between about 295° and about 315° C., then holding the reaction mass at a temperature within this range until oxidation to nicotinic acid is substantially complete, and recovering the nicotinic acid produced, the amount of catalyst employed being between about 0.5% and about 25% by weight of the quinoline.

WILBER OTIS TEETERS.

REFERENCES CITED

The following references are of record in the file of this patent:

Beilstein, vol. 20, 4Ed. p. 342 and 380. Copy in Div. 6.

Chemical Reviews, pages 333–339, vol. 27. Copy in Pat. Office Lib.

Maier "Pyridine and Siener Derivatives," 1934. Copy in Div. 59, pages 212 and 222.

Richter, Chemie der Kohlensoffverbindugen, Vol. III, p. 336–337. Copy in Division 59.